(No Model.)
G. A. BRONSON.
DENTAL NAPKIN HOLDER.
No. 531,094. Patented Dec. 18, 1894.
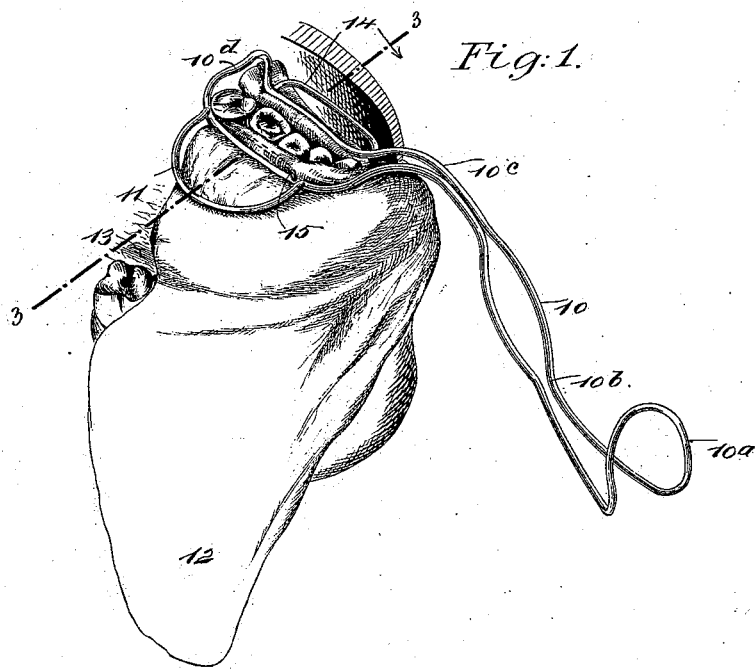
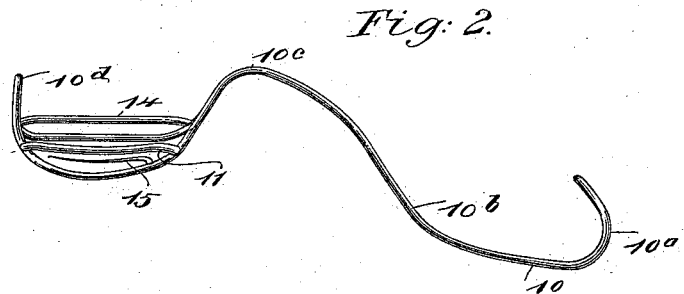
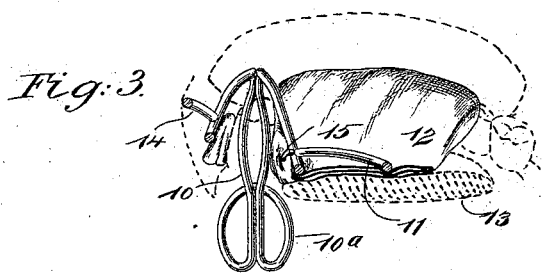
WITNESSES:
John A. Rennie
Wm. L. Patton
INVENTOR
G. A. Bronson
BY Munn & Co.
ATTORNEYS.

UNITED STATES PATENT OFFICE.

GEORGE A. BRONSON, OF ST. LOUIS, MISSOURI.

DENTAL NAPKIN-HOLDER.

SPECIFICATION forming part of Letters Patent No. 531,094, dated December 18, 1894.

Application filed May 21, 1894. Serial No. 511,942. (No model.)

*To all whom it may concern:*

Be it known that I, GEORGE A. BRONSON, of St. Louis, in the State of Missouri, have invented a new and Improved Dental Napkin-Holder, of which the following is a full, clear, and exact description.

My invention relates to a new and improved instrument for the use of dentists, and has for its object to provide a novel, simple and efficient device, which affords means for the convenient and proper retention of a folded napkin or other porous material within the mouth of the patient, so as to retain the tongue depressed, and the napkin pressed against the gum on each side of the teeth that are being operated upon, and effectively absorb salival moisture during the operation on said teeth.

To this end my invention consists in the construction and combination of parts, as is hereinafter described and claimed.

Reference is to be had to the accompanying drawings, forming a part of this specification, in which similar figures of reference indicate corresponding parts in all the views.

Figure 1 represents a perspective view in part of the lower jaw of a person and the improvement in position, showing its application to hold the tongue depressed, and a folded napkin pressed closely against the gums on each side of the teeth that are to be operated upon. Fig. 2 is a side view of the improved napkin holder; and Fig. 3 is a transverse sectional view of the device on the line 3—3 in Fig. 1, showing the application of the instrument to press a folded napkin on the tongue and each side of a tooth against the gum, the portions of the mouth shown being indicated in dotted lines.

The improved napkin holder, is preferably bent from a strand of wire, and comprises a double limbed handle-piece 10, of a convenient length, which is curve bent at $10^a$ to form a hook on its outer end portion, and is also curved at $10^b$ and $10^c$ to adapt said handle for convenient manipulation while in service.

On the portion of the handle piece 10 that is to be inserted in the mouth of a person during a dental operation, there is a semi-circular presser wing 11 formed on or secured to one member of the furcated handle piece, which wing is laterally projected a sufficient degree to enable a proper pressure to be applied by this wing upon the upper surface of the person's tongue, the folded napkin 12 or other absorbent pad being introduced between the wing and the tongue 13, as is clearly indicated in Fig. 3.

The limbs of the handle piece 10 are properly spaced apart at the end nearest to the wing 11, by a cross piece $10^d$ which may be integrally formed with them, and on the limb that in service is located between the cheek of the patient and the outer side surface of the teeth on that side of the mouth, a presser loop 14 is formed or secured, this being preferably produced from wire as is also the wing 11.

A keeper tang 15 may be provided for the retention of the folded fibrous material in connection with the limb of the handle piece 10 whereon the wing 11 is formed or secured. This needle-like attachment if employed in connection with the instrument proper, is secured by one end near the forward part of the wing 11, projecting its sharp free end rearwardly, so as to be conveniently insertible in a folded portion of the napkin, which will retain the latter in place on the member and wing of the handle piece, as represented in Figs. 1 and 3. The tang is claimed in my companion application, Serial No. 511,941.

To apply the device, the napkin 12 or like fibrous material, is correctly folded and lapped around so as to lie on each side of the teeth that are to be operated on, and the improved holder is now introduced within the mouth, and made to press on the fibrous pad or napkin, so as to wedge it against the gums on each side of the teeth, the opening between the limbs of the handle piece permitting the wing 11, to press on the tongue, while the limb of the handle it is on is held toward the gums of the teeth, the latter being exposed for dental operations by their location between the handle limbs.

It will be seen that the looped presser piece 14, by its insertion between the cheek of the person and the gums of the teeth, on the porous pad that has previously been placed in position, will enable the party holding the outer end of the handle piece 10, by a downward pressure on the latter to retain the napkin in place.

As it is desirable that the dental operator should have free use of both hands while conducting a surgical or tooth filling operation, the patient or an assistant can retain in place the porous pad and the improved holder, after a proper adjustment of these parts has been made by the operator.

It may be necessary to provide sets of the improved napkin holders of slightly changed forms to suit different jaw conformations, and pairs for the right and left side will be needed.

The improvement from its construction is adapted for rapid and cheap production, and it is evident will greatly facilitate the proper retention of an absorbent pad during dental operations whenever it is used for such a purpose.

Having thus described my invention, I claim as new and desire to secure by Letters Patent—

1. A dental napkin holder, comprising a handle having two spaced limbs at one end, and a presser wing on one of said limbs and a presser piece on the other limb, substantially as described.

2. In a dental napkin holder, a handle piece divided near one end to produce two limbs, hooked at the other end and spaced apart where divided, a presser wing laterally projected from one limb, a keeper tang on said limb, and a looped pressure piece on the other limb opposite the wing, substantially as described.

GEORGE A. BRONSON.

Witnesses:
S. J. FISHER,
CHAS. F. LASSEN.